(12) United States Patent
Trojer

(10) Patent No.: US 7,881,219 B2
(45) Date of Patent: Feb. 1, 2011

(54) ARRANGEMENT AND METHOD OF CONFIGURING DIGITAL SUBSCRIBER LINES

(75) Inventor: Elmar Trojer, Täby (AT)

(73) Assignee: Telefonaktiebolaget LM Ericsson, Stockholm (SE)

( * ) Notice: Subject to any disclaimer, the term of this patent is extended or adjusted under 35 U.S.C. 154(b) by 288 days.

(21) Appl. No.: 12/296,691

(22) PCT Filed: Apr. 13, 2006

(86) PCT No.: PCT/SE2006/000448

§ 371 (c)(1),
(2), (4) Date: Oct. 10, 2008

(87) PCT Pub. No.: WO2007/120084

PCT Pub. Date: Oct. 25, 2007

(65) Prior Publication Data

US 2009/0175199 A1 Jul. 9, 2009

(51) Int. Cl.
*H04J 1/16* (2006.01)
*H04L 12/56* (2006.01)
(52) U.S. Cl. .................. 370/252; 370/430; 370/282

(58) Field of Classification Search .................. 370/252, 370/430, 282
See application file for complete search history.

(56) References Cited

U.S. PATENT DOCUMENTS

| 6,345,071 B1* | 2/2002 | Hamdi ..................... 375/222 |
| 2003/0182664 A1 | 9/2003 | Lusky et al. |
| 2005/0123027 A1 | 6/2005 | Cioffi et al. |

FOREIGN PATENT DOCUMENTS

WO WO 02100008 A1 12/2002
WO WO 2005057837 A1 6/2005

* cited by examiner

*Primary Examiner*—John Pezzlo

(57) ABSTRACT

An arrangement, method, and node for configuring subscriber lines in a digital access network. A configuration tool downloads configuration parameters from the network into the access nodes, which configure the subscriber lines according to the configuration parameters. An automated monitoring tool monitors performance parameters for the subscriber lines. The monitoring tool compares a value of a first monitored performance parameter on each subscriber line with a predefined threshold value, and based on a result of the comparison, either changes a value of a first configuration parameter or repeats the monitoring of the first performance parameter.

9 Claims, 8 Drawing Sheets

ARRANGEMENT AND METHOD OF CONFIGURING DIGITAL SUBSCRIBER LINES

TECHNICAL FIELD OF THE INVENTION

The present invention is related to configuring of subscriber lines in a digital access network.

DESCRIPTION OF RELATED ART

The introduction of Triple Play (3P) service delivery, i.e. the transport of video, voice and data towards a customer using DSL as transport media in the access domain of a public telephone network, causes several problems that are hard and expensive to tackle by network operators.

This is due to the fact that the new, highly-demanding services operate the DSL line at the border of feasible performance, where non-ideal effects like impulse noise and packet loss due to overload start to play a huge role when it comes to Quality of Service (QoS) requirements.

On one hand, each highly demanding service places demanding requirements on the access network, which needs to be well configured to make satisfying QoS feasible.

On the other hand, different local loops in the access network provide different transport behavior determined by the quality of the copper loop in question and environment the loop is placed in. Thus the DSL transport channel toward each customer is different and may need to be configured exclusively for the underlying physical conditions.

Classically a network engineer configures, optimizes and operates the DSL access domain of a public network. Built-in DSL testing tools and the experience of the network engineer determine the profile that is entered manually into a configuration tool and automatically executed toward the network nodes. During the time of operation, basic performance parameters and alarm traps are logged by the testing tool and supervised by the engineer. If a profile causes problems, the engineer is responsible for troubleshooting and profile changes to find a working configuration. This procedure is sufficient when dealing with a single low-demanding best effort service like Internet access. Since most lines can be served by the same profile, fault management rather than optimization is important. A low number of profiles need to be setup and managed by the network engineer. Internet services are transported over the robust TCP/IP stack and with rates below the sustainable limit rates. The differences in line quality are negligible and the same network/service configuration (user profile) can be used for most DSL subscribers. Thus, the configuration and troubleshooting task (support activities) for the network engineer is not very demanding and most customers are easily satisfied.

Problems arise when new services like video and voice should be transported on the same line beside best-effort Internet. Opposite to the provision of just best-effort Internet, resources on the local loop have to be used in a smart way to make the co-existence of several services feasible in a first step, and to provide QoS thereafter. Most operators have started to launch the deployment of service-bundles to DSL subscribers, including Voice over IP and TV over UDP (SDTV and HDTV). These new services are highly-demanding and place QoS constrains on the network. In such a scenario, the fluctuation in the DSL quality given by the physical cable vitality and the noise environment leads to very high operational costs when it comes to service provisioning and QoS delivery.

For a single low-demanding service, most lines work with a standard profile determined by the service. For several high-demanding services the spread of feasibility and QoS provision in terms of lines and users increases dramatically and troubleshooting becomes a big and expensive task for network operators.

A description of an access network and its configuration according to present technology is to be found in "System Overview EDA", Ericsson AB—2005.

SUMMARY OF THE INVENTION

The present invention is concerned with the above mentioned problem that in a digital access network transporting services like video, voice and internet together, it is difficult and expensive to configure the subscriber lines in the access network in an efficient way.

Another problem is to guarantee a predefined performance for a subscriber line without using excess line capacity.

A further problem is to keep best performance for the subscriber line under varying outer circumstances.

Still a problem is to indicate when a subscriber line does not work.

The problem is solved in the following manner. To keep an acceptable capacity and quality of service on the subscriber line, actual parameters for a subscriber line are automatically monitored by a monitoring tool. Threshold values are defined for certain performance line parameters which indicate essential line properties such as line stability and packet loss. The thresholds are compared with actual monitored mean values of the corresponding performance parameter. Based on this comparison the monitoring tool changes the value for configuration parameters of the line. The result of the change is observed and the configuration tool successively monitors and reconfigures the line. The capacity and quality of service for the line can be kept on an acceptable level.

In some detail, both the upstream and the downstream direction of the subscriber line can be handled. Also, when changing the configuring parameters different attempts can be made by the monitoring tool and the outcome of the different attempts are compared. The attempt causing the smallest penalty in an essential configuring parameter is selected for the change while still the performance parameter does not cross its threshold.

A purpose with the invention is to automatically configure subscriber lines in a copper access network with a minimum of management by operators. The network is intended to transport services like voice, video and data in parallel.

Another purpose is to guarantee a predefined performance without using excess line capacity.

A further purpose is to keep best network performance under varying outer circumstances.

Still a purpose is to indicate a non-working subscriber line.

An advantage is that line configuration works automatically with little human intervention. Costs for customer support can be reduced.

Another advantage is that so called Triple Play, i.e. simultaneous transmission of voice, video and data, can be performed with good quality of service.

A further advantage is that the subscriber lines are optimized individually and a single line can be utilized to its maximum. On poor lines, a minimum service delivery is guaranteed. For medium and good lines, fallow excess capacity is transformed into quality of service and line stability. Non-working lines can be indicated and handled.

Still an advantage is that the coverage, i.e. the number of users that can be supplied with a service, is increased.

The invention will now be described in more detail with the aid of exemplifying embodiments with reference to the appended drawings.

DETAILED DESCRIPTION OF EMBODIMENTS

Figure 1:
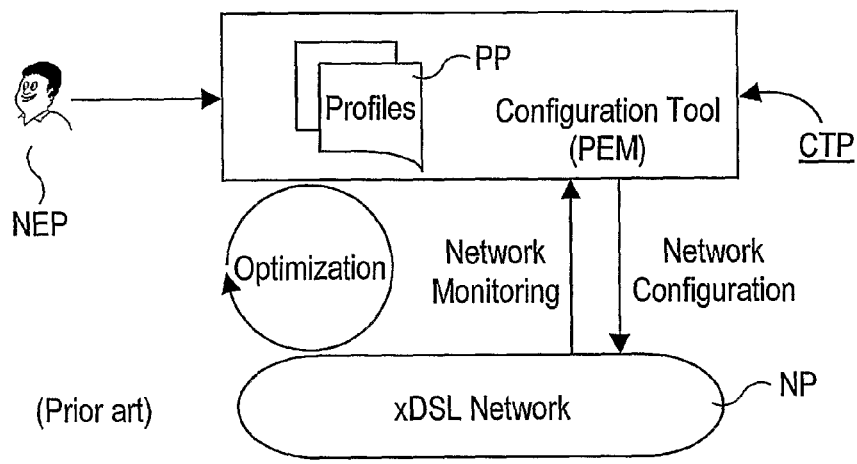
FIG. 1 shows a block schematic of a prior art line configuration arrangement.

FIG. 1 shows a prior art arrangement for configuring a digital network NP. A configuration tool CTP with access to network profiles PP is connected to the network and is managed by a network engineer NEP. The classical way of configuring, optimizing and operating the digital network NP is that built-in DSL testing tools and the experience of the network engineer NEP determine the profile PP that is entered manually into a configuration tool. It is then automatically executed toward the network nodes. During the time of operation, basic performance parameters and alarm traps are logged by the tool and supervised by the network engineer NEP. If a profile causes problems, the engineer is responsible for troubleshooting and profile changes to find a working configuration.

Figure 2:
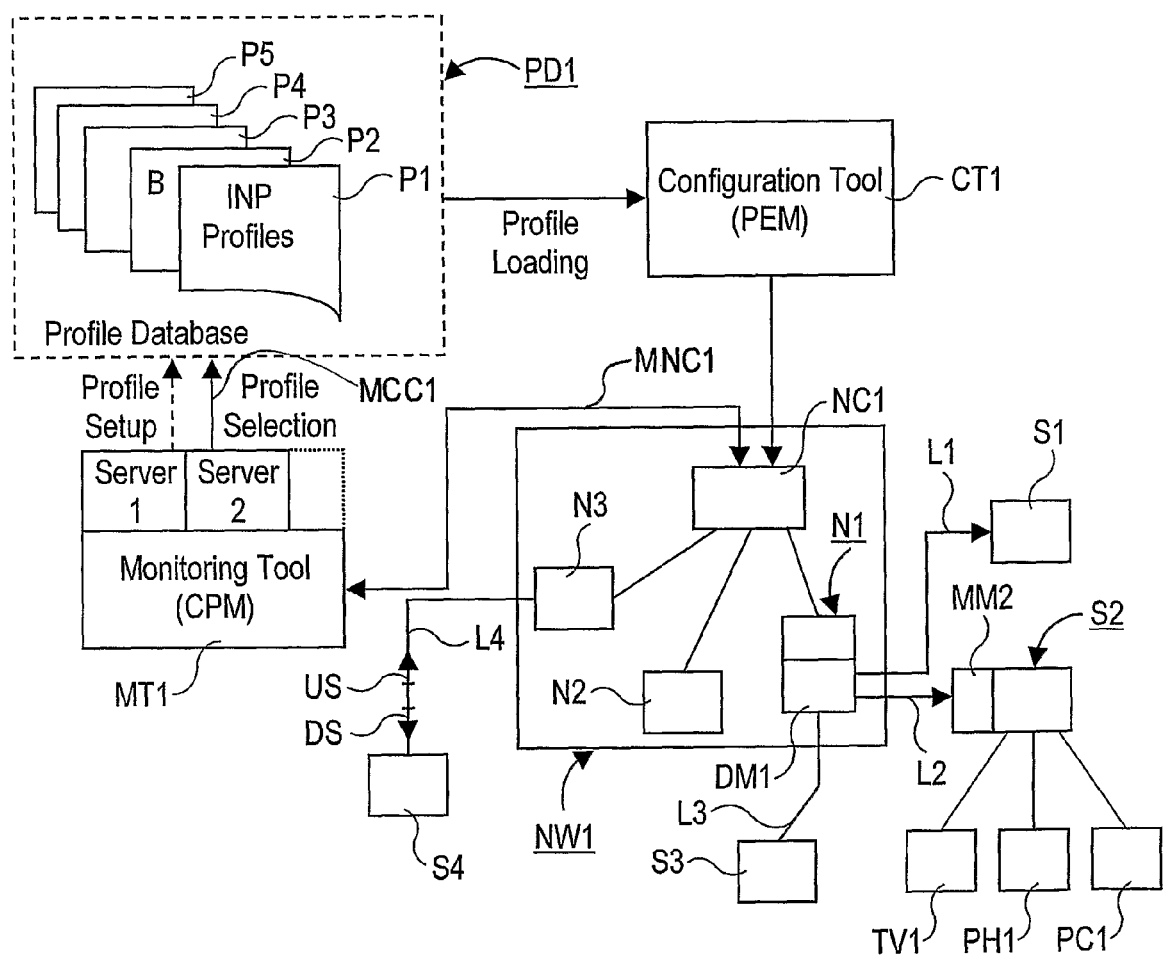
FIG. 2 shows a block schematic of a line configuration arrangement.

FIG. 2 shows an arrangement for configuring a digital access network NW1. The network is connected to a configuration tool CT1, which in turn is connected to a profile database PD1. An automatic monitoring tool MT1 is connected to the network NW1 via a connection MNC1 and to the profile database PD1 via a connection MCC1. The network has a node controller NC1 connected to the configuration tool CT1, the monitoring tool MT1 and to a number of interconnected access nodes N1, N2, N3 in the network. Subscribers S1, S2, S3 and S4 are connected to the access nodes via copper subscriber lines L1, L2, L3 and L4. The access nodes have each a DSLAM access module, e.g. a module DM1 in the node N1 and the subscribers have each a modem, such as a modem MM2 at the subscriber S2. Parameter values of the line such as bit rate, noise and packet loss are measured in a conventional manner. The subscribers can require different services, such as TV, telephone and data transmission as exemplified for the subscriber S2 with a TV set TV1, a telephone PH1 and a personal computer PC1. The profile database stores a number of network profiles P1, P2, P3 and P4 with each a bundle of parameters, the parameters having each a specified value. These parameters can e.g. be bit rate R or impulse noise protection INP. Initially the properties of the subscriber line can be completely unknown. The line configuration will be performed both in an upstream US and a downstream DS direction.

When configuring the network NW1 the network profiles are loaded into the configuration tool CT1, which translates one of the received profiles, e.g. profile P1, and downloads it in the network controller NC1. The latter transmits the network profile to one of the access nodes, e.g. the node N1, which configures one of its subscriber lines, e.g. the line L2 to the subscriber S2. The configuration aims at setting configuration parameters, such as bit rate R, delay D, Impulse Noise Protection INP and SNR margin, for the line. This shall be performed such that requirements for a number of performance parameters for the line are fulfilled. Examples on performance parameters are corrected codeword FEC or Errored Second ES.

Since all subscriber lines L1 . . . L4 are different in terms of length and noise environment, an average standard profile assigned to all the subscribers lines L1 . . . L4 is not very efficient. On one hand, good lines are not making use of their excess capacity and on the other hand more dramatically, bad lines are not working at all with such a profile.

Different services require different resources, i.e. different values of the configuration parameters. The values of the configuration parameters in turn influence the values of the performance parameters. Threshold values for the performance parameters are predefined for the different subscriber lines such that the different services can work appropriately with appropriate values on the configuration parameters.

The monitoring tool MT1 supervises the subscriber lines L1 . . . L4 by checking the configuration parameters and logging and evaluating the performance parameters. The monitoring tool MT1 then changes the value of an appropriate one of the configuration parameters, e.g. the SNR margin value. The impact on a predefined one of the configuration parameters of this change is then tested.

To check if the SNR margin parameter change really is appropriate, the original SNR margin parameter is restored and another one of the configuration parameters is changed. The impact of this second change on the predefined ones of the configuration parameters is also tested and the two test results are compared. The change giving the smallest penalty on performance for the predefined configuration parameter is selected.

The monitoring tool transmits a profile P5 with the selected changed parameter value to the configuration tool CT1, which is instructed to load the profile P5 in the access node N1 via the node controller NC1. The monitoring tool MT1 continues to supervise the performance parameters for the subscriber lines L1 . . . L4 and changes iteratively the configuration parameters. In that way e.g. the line L2 will successively get better values in the sense that it will work in a stable manner while still the configuration parameters have acceptable values.

The monitoring tool MT1 and the configuration tool CT1 will be described below in connection with FIG. 3. As described above the monitoring tool MT1 is connected to the network NW1 and to the configuration tool CT1 which is also connected to the network.

The monitoring tool MT1 includes a Copper Plant Manager server CPM1 and a CPM client CC1. The monitoring tool MT1 is used to carry several different tools that are useful when operating the DSL network NW1. One of these tools of certain interest for the present description is an automatic optimizer DAO1. The server CPM1 establishes interfaces and its functional blocks are used by the optimizer DAO1 and also by other tools. These functional blocks are listed and described in the following.

The server includes an element handler EH1 connected to the network NW1 via the connection MNC1. The handler EH1 is a functional entity that is necessary to establish a management channel with the network elements like the DSLAM module DM1 in FIG. 1. The management channel is used to read out line-specific information like rate, delay, INP and SNR margin, i.e. line configuration parameters used by the optimizer DAO1. The information is input data into the optimizer coming from the copper lines in the network NW1.

The element handler EH1 is connected to a line test handler LTH1. This functional entity specifies what kind of data should be read from which of the network elements N1, N2, N3. This specification of data type is handed over to the element handler EH1 to actually perform the data readout (SNMP query) from the correct DSLAM hosting the DSL line, e.g. the subscriber line L2, which the optimizer DAO1 operates on (addressing info). The line test handler LTH1 is also responsible for writing new data, i.e. line performance parameters, into a database DB1 by using a database handler DBH1.

The line test handler LTH1 is connected to a scheduler server SS1 which is connected to the database handler DBH1. This functional entity, server SS1, specifies the timing of the monitoring of the optimizer DAO1, i.e. when and how often the element hander EH1 should read out the data specified by the line test handler LTH1. The configuration of the scheduler server SS1 is done by the client CC1 via an interface of a configuration and viewer element CV1 for the optimizer DAO1.

The automatic optimizer DAO1 is connected to the database handler DBH1. The optimizer DAO1 is running an algorithm performing the method of configuring the subscriber lines L1 . . . L4. The optimizer performs the method based on the data in the database DB1 fetched by the line test handler LTH1. In some detail, the optimizer DAO1 computes the statistic data (averages) from the data measured on the subscriber line, compares the thresholds configured by the block CV1 in the client CC1 and initiates some profile changes (INP, SNR margin) if a threshold is crossed. Logging information is handled to the client CC1 for user viewing in the configuration and viewer block CV1.

A communication channel MCC1 between the server CPM1 and the configuration tool CT1 is established by an external interface handler EIH1. Its interface is used to load new profiles P1 . . . P5 with parameters into the configuration tool CT1. It also advices the configuration tool to load the new parameters on the DSLAM, e.g. the DSLAM DM1, hosting the actual line L2.

A detailed description of the monitoring of the subscriber lines L1 . . . L4 and the optimizer DAO1 will be presented below.

Monitoring of Subscriber Lines

Depending on the algorithm in use, different parameters need to be collected by the monitoring tool MT1 and processed by the optimizer DAO1. The following sequel, defines the parameters that need to be collected. The parameters can be divided into configuration parameters and performance parameters. Configuration parameters define a direction/line/channel configuration whereas performance parameters represent the performance of a running configuration.

Performance Parameters

There are several performance parameters that are defined in e.g. ADSL2(+). The ones related to physical layer performance playing a role for the optimizer DAO1 are listed here and discussed in more detail below.

FEC: corrected codeword, passed on as good data
This parameter indicate the noise environment.
CRC: corrupted data leading to frame drops
ES (Errored Second): one or more CRCs in a second, or other line failures such as loss of signal (LOS) or loss of power (LOP)
SES (Severely Errored Second): 18 or more CRCs in a second, one or more LOS, one or more SEF, one or more LPR
The parameters CRC, ES and SES indicate the packet loss.
UAS (Unavailable Second): 10 consecutive SES, yields directly to a retrain
This parameter indicates the line stability.

There are strict dependences between the performance parameters. The UAS counter is retroactive, i.e. 10 SES that declare UAS are counted retroactive as 10 UAS. During unavailability (UAS declared) and during SES, all other performance parameter counts are inhibited, i.e. CRC counters are stopped. During unavailability, SES and ES are inhibited. During SES, ES are not inhibited.

In short the optimizer DAO1 monitors the parameters ES and UAS which are directly derived from CRCs according to the rules mentioned above for performing the line stabilization. The FEC counter is monitored and used for reversing the action of stabilization (rate increase).

Configuration Parameters

Figure 4:
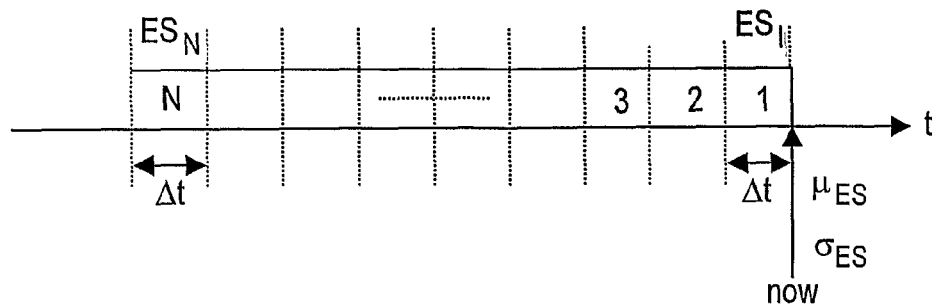
FIG. 4 shows a time diagram over the measuring of a parameter.

The optimizer DAO1 needs for its operation knowledge about the running line configuration. Thus it must be possible to receive the following pieces of information:
Rate R: The actual bit rate of a stream (Direction)
Delay D: The actual time delay for a stream (Direction)
INP: Actual Impulse Noise Protection INP value
SNR margin $\Delta$SNR: Actual Signal Noise Ratio SNR margin Monitoring Details The monitoring of FEC, ES and UAS has to be performed on a long-term basis (1 day, 2 days) in equidistant time intervals. The general monitoring procedure is depicted in FIG. 4, which is a time t diagram exemplifying the monitoring of the parameter ES.

Mean value and standard deviation of the counters are computed over a historical interval of length N$\Delta$t. Configurable parameters are:
the interval size $\Delta$t: Time interval (hours, minutes, seconds) between two parameter measurements, and
the windows size N: The number of intervals the mean and standard deviation procedure should span over.
Mean value $\mu$ and average standard deviation $\sigma$ of the parameters are computed in conventional manner.

Algorithm in the Optimizer DAO1

Figure 5:
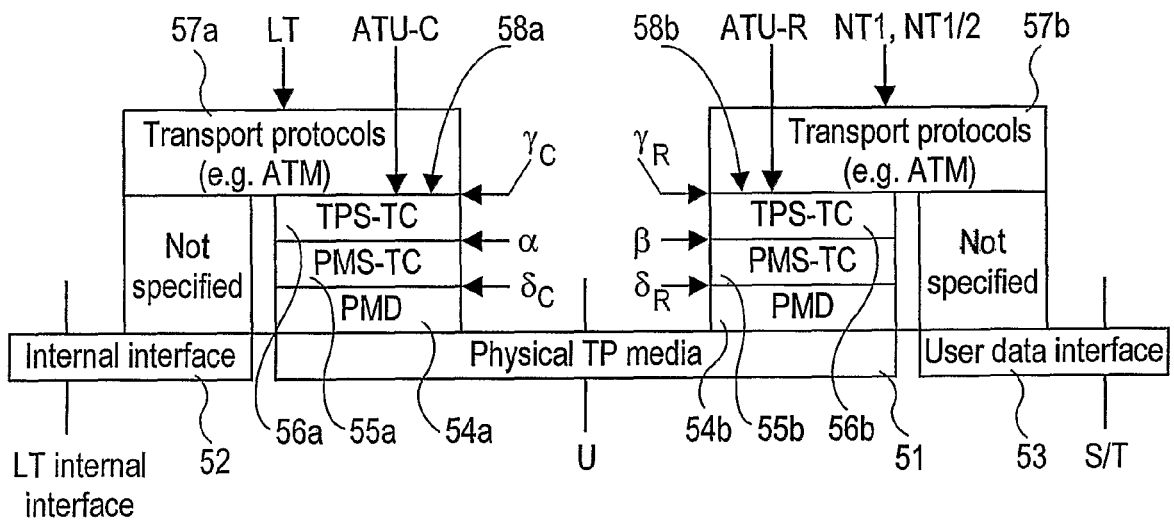
FIG. 5 a block schematic of a protocol stack.

The algorithm in the optimizer DAO1 is used to optimize a physical unidirectional channel in terms of line stability and impulse noise protection. An example is the ADSL2(+) unidirectional channel for which the protocol stack is shown in the block schematic in FIG. 5. ADSL2(+) is defined in ITU-T recommendation G992.5, Asymmetric Digital Subscriber Line Transceiver—Extended Bandwidth (ADSL2plus), May 2003. ATU-C (DSLAM), ATU-C (Modem) are ADSL transceiver unit—central office/customer premise side. Block 51 is the physical transport media and blocks 52 and 53 are internal interface and user data interface respectively. Blocks 54a and 54b are the Physical Media Dependent PMD sub layer. Blocks 55a and 55b are the Physical Media Specific PMS TC (Transmission Convergence) layer and blocks 56a and 56b are the Transmit Protocol Specific TPS TC layer. The blocks 57a and 57b are transport protocols, and 58a and 58b are an ADSL Transceiver Unit-Central (ATU-C) and an ADSL Transceiver Unit-Remote (ATU-R), respectively.

The algorithm works on the application invariant part of the ATU covering PMS-TC and PMD functions on either the upstream US or downstream DS flow. The Transmit Protocol Specific TC layer (TPS-TC) is responsible for transmitting synchronous streams (STM-TC), asynchronous streams (ATM-TC) or packet data (PTM-TC) is not covered by the algorithm.

Since both DS and US directions are independent in their operations due to Frequency Division Duplexing (FDD), the whole latency path function #0 (channel 0) can be optimized by operating two independent algorithms in the DAO1 optimizer in parallel, one for the DS frame bearers and one for the US frame bearer.

Basically it is the algorithm in the optimizer DAO1 that stabilizes the ADSL2(+) transportation channel by tuning the PMS-TC and PDM-TC function. The average long-term behavior of the line in terms of stability and packet loss is monitored and stabilization-actions are taken in case of problems. In present embodiment, Signal to Noise margin (SNR Margin) and Impulse Noise Protection (INP) are changed in a slow way to guarantee the required link characteristics needed for sufficient QoS on higher layers.

The SNR margin thereby provides a soft way to increase the stability, whereas the INP accounts for a more aggressive strategy. A combination of both is reasonable.

Impulse Noise Protection.

In ADSL, Reed Solomon (RS) coding, interleaving, and Discrete Multitone Trellis Modulation (DMT) are used to provide a broadband inter-symbol interference (ISI) free physical broadband channel. The Physical Media Specific TC function (PMS-TC) thereby performs frame-bearer multiplexing, data scrambling, cyclic redundancy check (CRC) computation, Reed Solomon Forward Error Correction (FEC), and diagonal Interleaving within a latency path. The Physical Media Dependent (PMD) function provides the Trellis modulation encoding and DMT Fast Fourier Transform (FFT) procedures.

PMS-TC obtains received data from the corresponding lower receive PMD function and applies error correction and error detection based on the CRC and FEC octets. If data on the transmission path is corrupted by an erroneous transmission over the local loop, forward error correction is applied depending on the strength of the interleaved RS code.

If an error can be corrected by the FEC channel decoder, a so called FEC event occurs, which means that the data could be restored and passed over to higher layers as good data.

If the FEC is not strong enough to correct a whole sequence of MDSs protected by the FEC redundancy (the R redundancy octets), a so called CRC event occurs which yields to discarding the data and degrading the physical link performance and stability. The CRC counter is the key parameter to define line performance and stability as outlined in Subsection 0.

Impulse Noise Protection (INP) accounts for the capability of the PMS-TC function to correct bit errors caused by noise on the line. The INP value, as formulated in Equation 1, defines how many consecutive DMT symbols (L bits of a data frame) can be corrected if corruption occurs.

Equation 1: $INP$ Definition 1

$$INP = D\frac{R}{2}\frac{1}{L/8}$$

Equation 2: $INP$ Definition 2

$$INP = D\frac{R}{2}\frac{S}{N}$$

With S=8N/L denoting the number of DMT symbols per FEC frame, INP can also be written as in Equation 2. From there it is clear that INP is virtually affected by three components. The redundancy of the coding is reflected by the parameters R (number of redundancy octets per data frame) and N (length of the data frames), the interleaver depth D (in number of code words of length N+R), and the framing parameter S (number of DTM symbols per code word, i.e. FEC frame). Depending on the implementation of the ranges of these parameters, different INP scales are supported by a pair of DSLAM modem.

The redundancy of the code (code rate) directly influences the data rate of the transmission whereas the interleaver introduces delay. Thus a higher INP values has to merit by placing penalties on rate and/or delay. Both rate and delay can be traded off to provide a desired degree of impulse noise protection.

ADSL provides a configuration parameter to guarantee a minimum impulse noise protection INP on a physical stream.

The algorithm in the optimizer DAO1 makes use of the parameter INP to stabilize the line in terms of error susceptibility.

SNR Margin

Despite the use of the parameter INP, the parameter SNR margin $\Delta SNR$ can be used to upgrade the stability of an ADSL system. In DMT, the whole transmit spectra is divided into several small frequency channels (tones or subcarriers) which then can be used independently to transport data Inter Symbol Interference ISI-free by using Trellis coded modulation.

The rate of the whole transmission can then be computed as the sum of the rates over all subchannels, depending on the receive SNR on the tones and the SNR gap $\Gamma$. Using the geometric SNR mean $SNR_g$, the total capacity (Shannon capacity) of the channel is given by Equation 3.

Equation 3: Rate $$r = \frac{1}{2}\log_2\left(1 + \frac{SNR_g}{\Gamma}\right)$$

Equation 4: $SNR$ Gap in dB $$\Gamma = K + \Delta SNR - \gamma_c$$

The gap $\Gamma$ as formalized in equation 4 thereby accounts for the rate penalty in view of the channel capacity introduced by non-ideal coding. It is made up of a constant K determined by the modulation scheme, the SNR margin and the coding gain $\gamma_c$. Thus a higher coding gain reduces the gap, whereas a higher SNR margin broadens the gap towards the channel capacity (the theoretical maximum rate).

For a given coder/modulator a specific minimum receive SNR is required to provide a given bit error ratio (BER). The SNR margin determines how much the actual receive SNR can degrade by Additive White Gaussian Noise AWGN-like noise on the line to still hold the Bit Error Rate BER limit. A higher SNR margin decreases the rate as suggested by Equation 3 and Equation 4 because the bit-loading on the tones has to be reduced to hold the needed receive SNR for a given transmit power. The coding gain $\gamma_c$ has a positive impact on the gap. A higher SNR margin can be used if coding is applied.

Thus the SNR margin is a way to suppress the impact of noise on the line by introducing an SNR buffer on the receive side. However, this has to be merit by a rate penalty.

The algorithm in the optimizer DAO1 uses the SNR margin to stabilize the line in terms of AWGN-like noise.

Below will be described the relations between some of the performance and configuration parameters in connection with FIGS. 6, 7, 8, 9 and 10. The figures are examples on how the relations influence the algorithm in the optimizer DAO1.

Changing the INP Value

Figure 6:
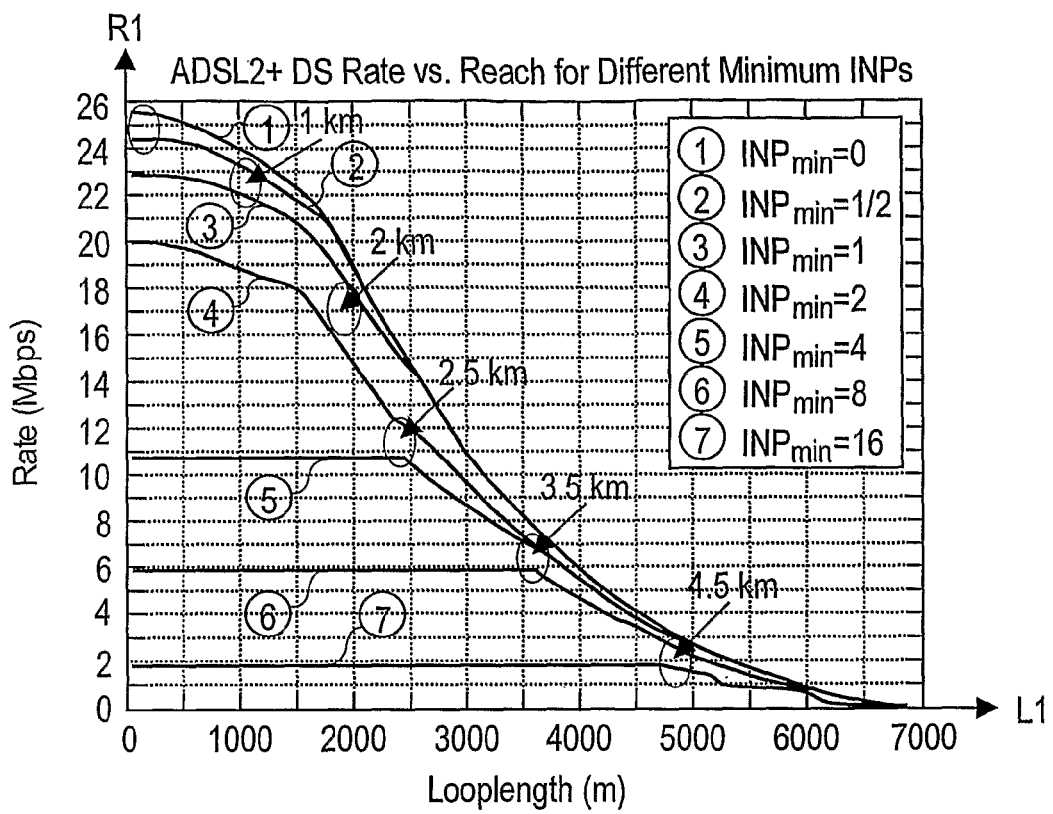
FIG. 6 shows a diagram for the downstream direction of a line with bit rate vs loop length for different INP values.

FIG. 6 is a diagram with loop length L1 for a subscriber line on the abscissa and bit rate R1 on the ordinate. The figure show typical downstream DS rate-reach curves 1-7 for ADSL2+ transmission, measured for different INP values 0-16 respectively.

As can be seen, for short lines, the penalty in rate R1 is unfortunately tremendously high for large INP values, e.g. INP=8 or 16 for the curves 6 and 7.

However, for medium and long range lines, curves with higher INP values are approaching lower INP curves and the rate penalty is getting smaller the longer a line is.

The ovals, denoted by the loop length in kilometers, are marking the limit lengths where the rate penalty of two adjacent curves is lower then 2 Mbps. Thus for loops shorter than these limits (brake points), switching up to the next higher INP value costs 2 Mbps or more and is therefore restricted.

Figure 7:
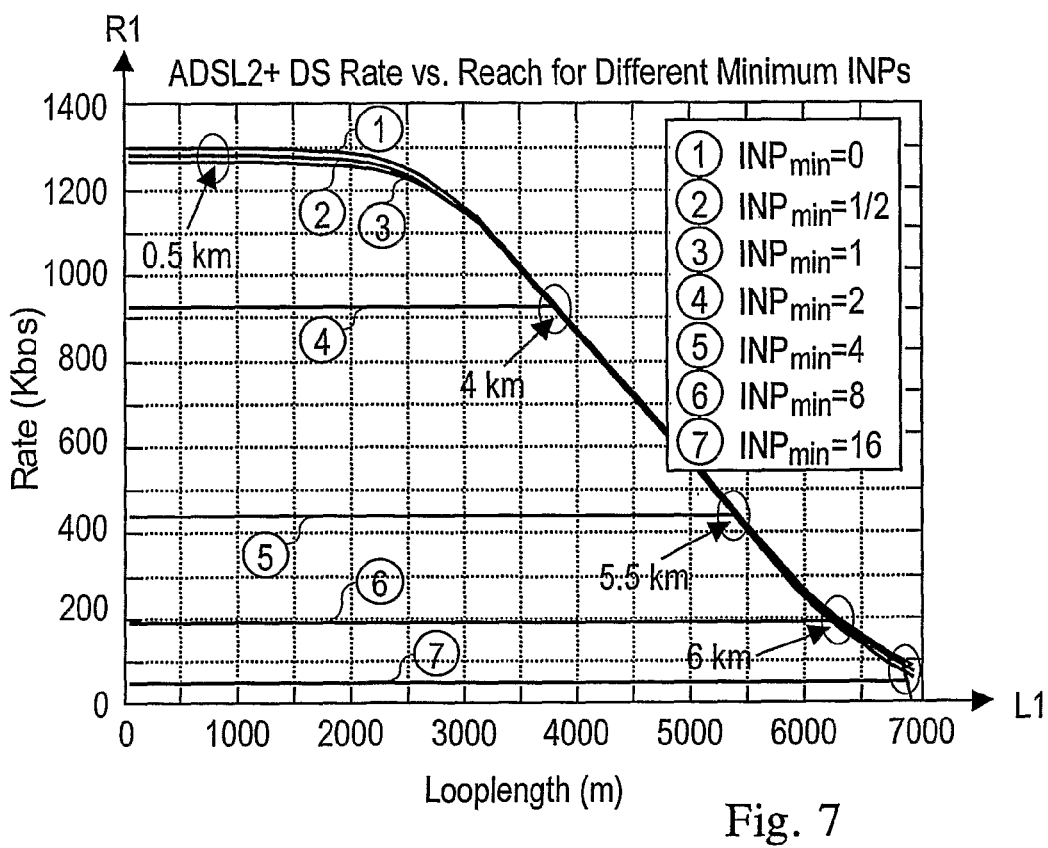
FIG. 7 shows a diagram corresponding to FIG. 6 but for the upstream direction.

FIG. 7 is a diagram similar to FIG. 6 and depicts the same situation but for the upstream US direction. It has curves 1-7 for INP values 0-16 respectively. As can be seen, the upstream behaves worse than the downstream since the beak points (the ovals) are positioned at higher loop lengths. However, for loops longer than the break points, an INP increase can be initiated without any rate loss.

It has been observed that increasing INP value increases the delay of the transmission. Both in the upstream and the downstream direction the delay penalty is around 8 ms, which does not restrict the use of increasing INP values.

For low range loops, increasing the INP value causes a big rate penalty. Thus for such loops, increasing INP is a rather aggressive strategy whereas for longer lines, the rate decrease is small and a higher INP value can be adjusted without big rate losses.

The above means that for short loops INP is used by the algorithm to roughly tune the line, whereas for longer loops INP can be enabled by default in case the increase in delay can be accepted.

Changing the SNR Margin

Figure 8:
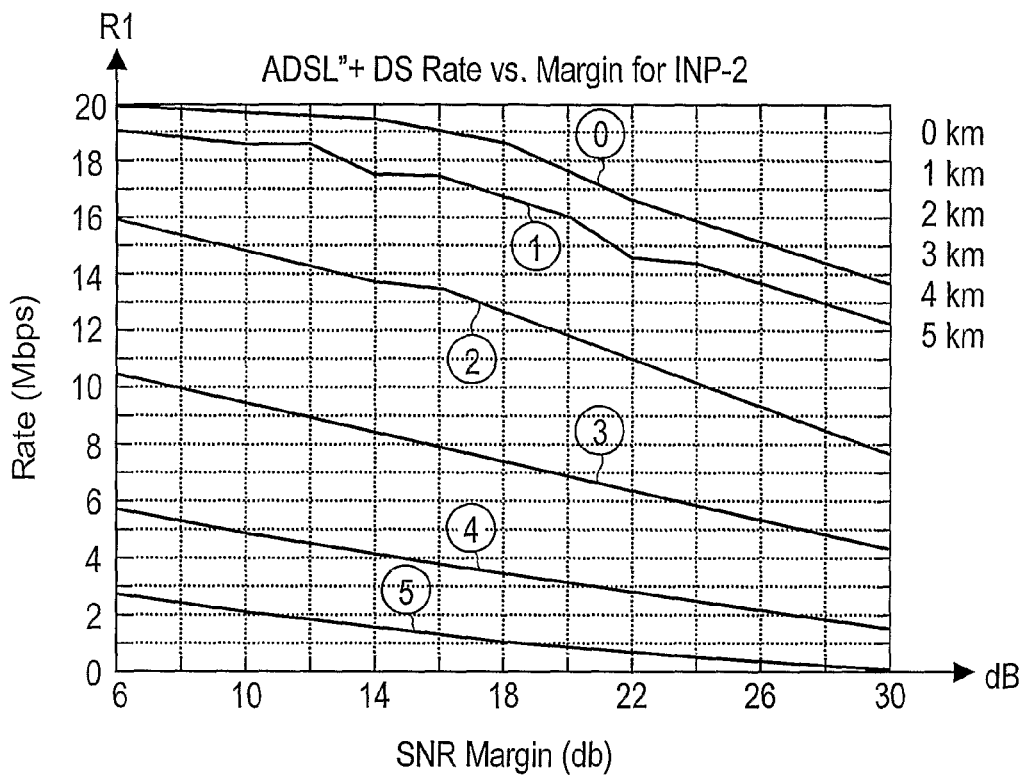
FIG. 8 shows a diagram for downstream with bit rate vs SNR margin for different loop lengths.

FIG. 8 is a diagram with SNR margin SNR1 in dB on the abscissa and a bit rate R1 on the ordinate. Curves 0-5 for different loop lengths in kilometers are presented. An increased SNR margin yields to a nearly linear decrease in the rate R1. This decrease depends mainly on the INP value and the line length. FIG. 8 depicts the downstream rate over the SNR margin for different line lengths at an INP value of two.

Figure 9:
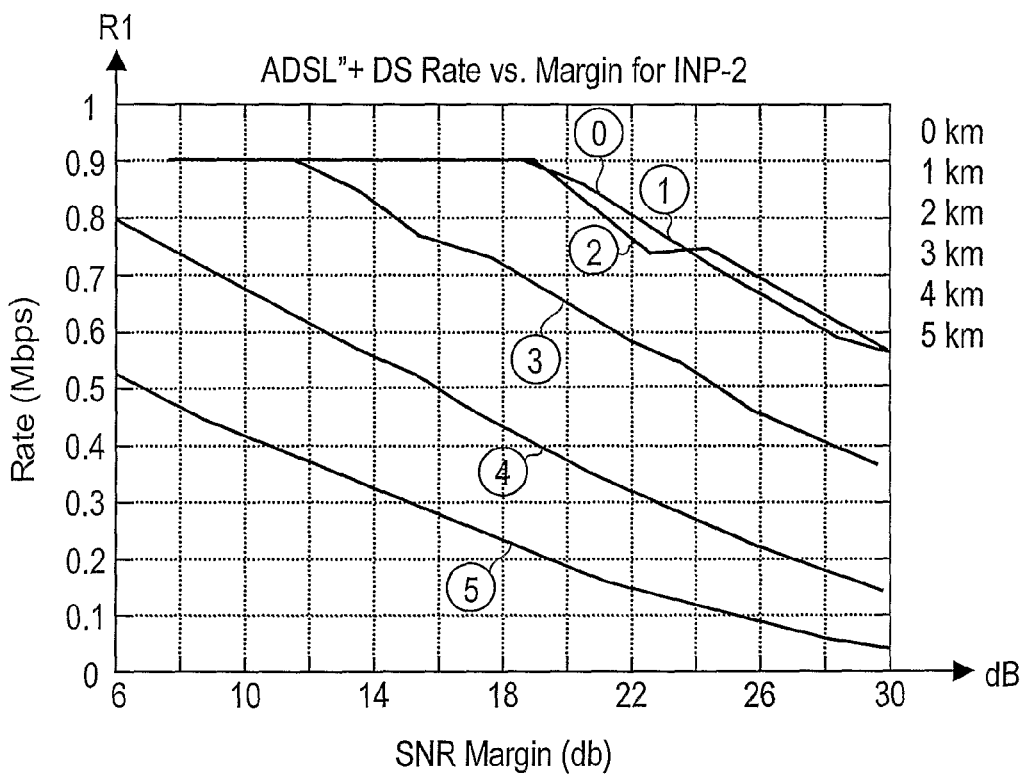
FIG. 9 shows a diagram corresponding to FIG. 8 but for the upstream direction.

FIG. 9 is a corresponding upstream diagram, also with curves 0-5 for different loop lengths in kilometers. For low loop lengths, e.g. curves 0-2, an SNR margin increase in the area of low margins, below 18 dB, does not immediately cause a rate decrease. This effect can also be seen in downstream direction for higher INP values. This is also evident from Table 1 where the rate decrease per one dB SNR margin increase is listed for different loop length and INP values and for downstream/upstream direction. For an INP of zero, increasing the SNR by one dB yields a rate decrease in downstream of roughly 500 kbps for low range loops and around 200 kbps for long loops. The higher the INP value, the lower the rate penalty.

TABLE 1

| | Rate Penalty per 1 dB SNR Margin Increase Downstream/Upstream | | | | | |
|---|---|---|---|---|---|---|
| INP/length | 0 m | 1 km | 2 km | 3 km | 4 km | 5 km |
| 0 | 428/30 | 456/29 | 458/31 | 292/32 | 191/31 | 123/24 |
| 2 | 260/14 | 291/15 | 344/14 | 263/22 | 188/30 | 121/24 |
| 4 | 0/0 | 43/0 | 190/0 | 216/3 | 178/12 | 115/18 |
| 8 | 0/0 | 0/0 | 0/0 | 92/0 | 155/3 | 100/8 |

From the figures above it is obvious, that at least for short loops, the SNR margin can be used to stabilize a line without changing the rate too much.

Thus the SNR margin can be used as a fine-tuning tool in the algorithm in the optimizer DAO1.

Impact of SNR Margin and INP on Line Stability

The two parameters SNR margin $\Delta$SNR and INP can be used to make an ADSL line more robust to external disturbance. Enabling INP causes better error correction due to stronger coding whereas a higher SNR margin allows for more noise on the line. These two components add-up to more stability in terms of disturbance.

Figure 10A:
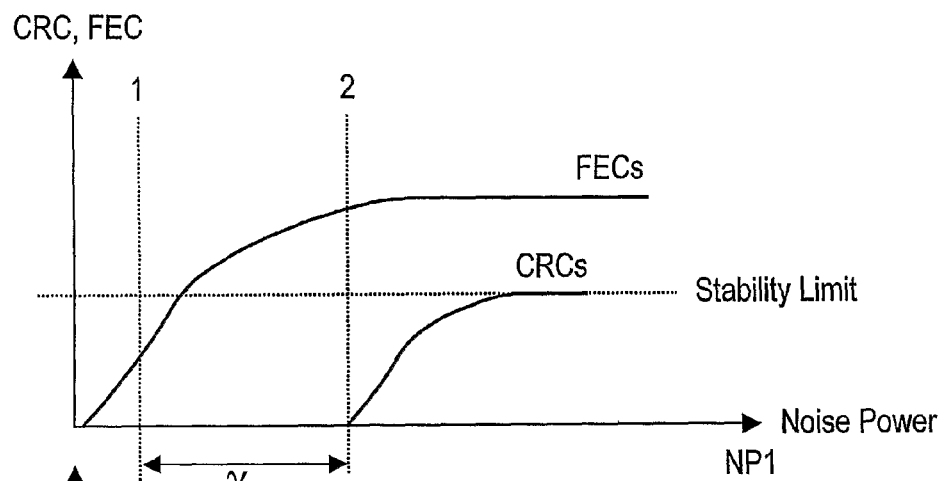
FIGS. 10a and 10b show diagrams with parameter values vs noise power.
Figure 10B:
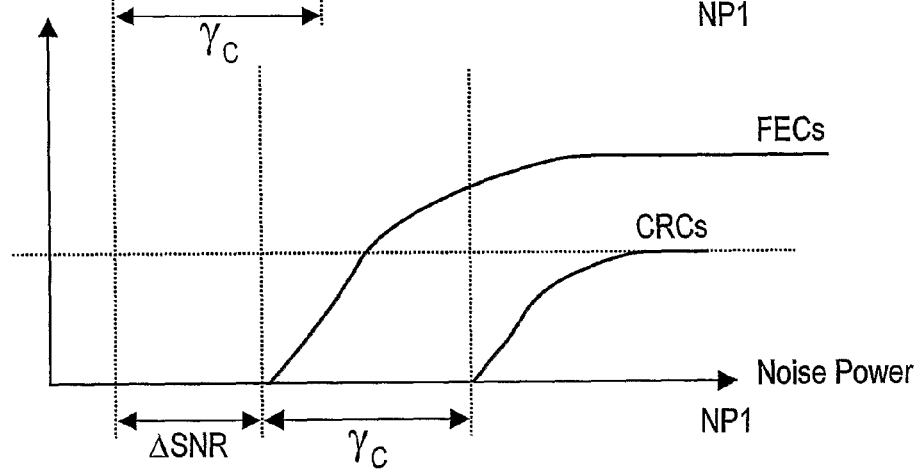

In principle, the performance parameters FEC and CRC occur on a noisy line as depicted in FIGS. 10*a* and 10*b*. The figures are diagrams with noise power NP1 on the abscissa and values for the parameters CRC and FEC on the ordinate. The figures have each a curve for the number of FEC events and the number of CRC events. With increasing noise power, the number of FEC events increases until the code is not strong enough to correct all error in the data and CRCs occur. CRC events result in data loss and in a resynchronization attempt as an end consequence.

The amount of noise power in-between the start of the FEC curve and the CRC curve is connected to the coding gain $\gamma_c$ and thus to the INP value. A higher INP value broadens the gap between the starting points of FEC and CRC curves.

The top FIG. 10*a* principally shows the evolution of the FEC and CRC parameter events for a given SNR margin. The bottom FIG. 10*b* shows that the starting point of the FEC parameter events is shifted towards higher noise powers for an increased SNR margin $\Delta$SNR.

Thus with the SNR margin $\Delta$SNR, the origin of both the curves for FEC and CRC events can be shifted out in view of noise power whereas with the INP value, the occurrence of bad CRCs can be pushed towards higher noise power values. With the combination of both, required stability can be setup.

Optimizer DAO1

Figure 3:
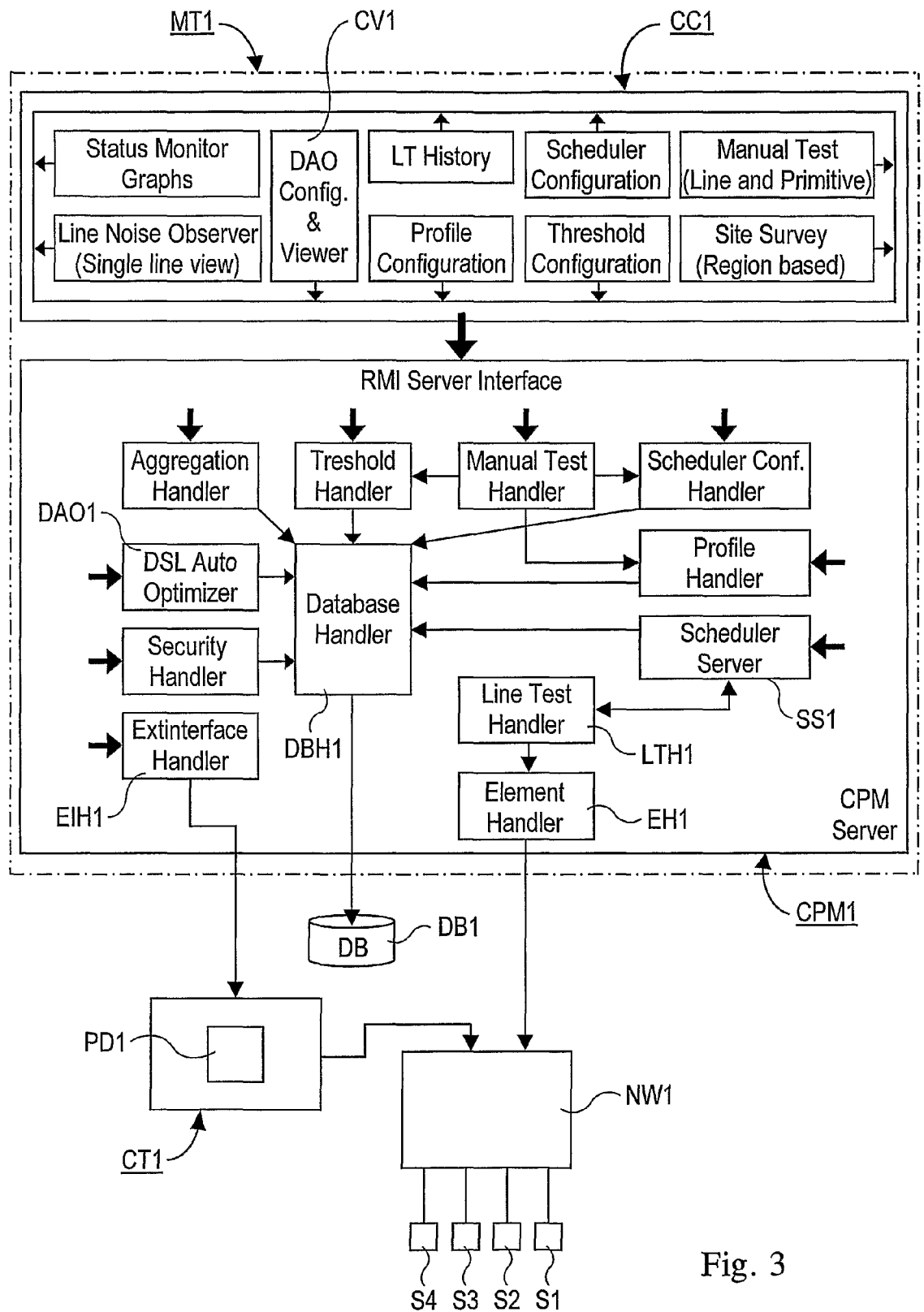
FIG. 3 shows a block schematic of a monitoring tool.
Figure 11:
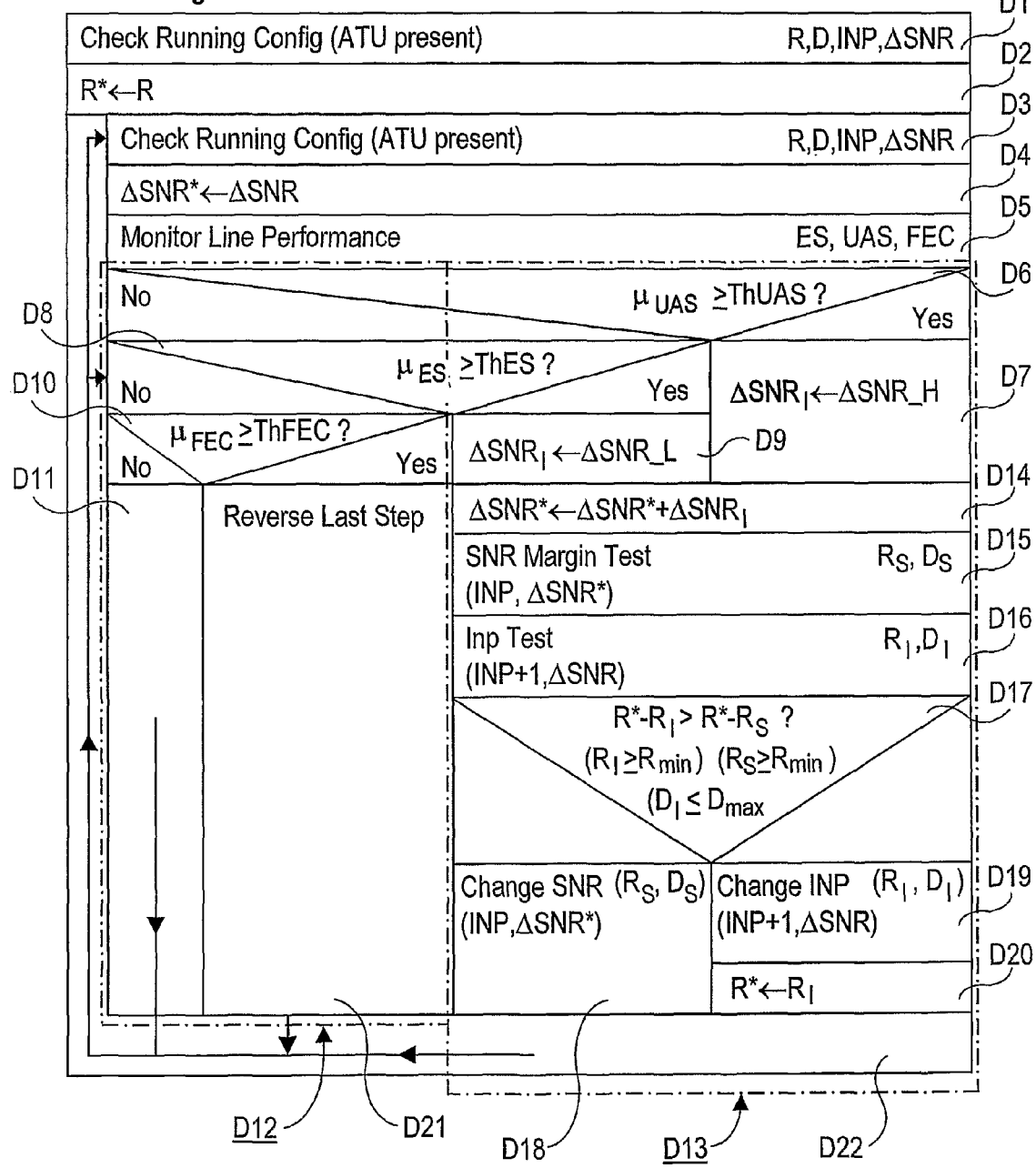
FIG. 11 shows a flow chart over a method in an optimizer.

The optimizer DAO1 in FIG. 3 works in accordance with a method which is shown in a flowchart in FIG. 11.

In brief the method includes two parts, a stabilizer part D13 and a performer part D12. The stabilizer part D13 stabilizes the subscriber line, e.g. the line L2 in FIG. 2, by increasing either of the parameters the SNR margin or the INP value. The decision what to increase is based on the penalty in the rate R that both strategies provoke. Also a constraint in a delay D and/or the rate R can be added. Two thresholds are set for the number of events for the parameters ES respectively UAS added to guarantee a minimum rate and/or maximum delay needed for services on higher layers. A low threshold ThES for ES events is coupled to a low SNR margin increase ΔSNR_L, whereas a high threshold ThUAS for more severe UAS accounts for a high margin increment ΔSNR_H. The performer part D12 simply checks if the average in the parameter FEC number are lower than a given threshold ThFEC to revert the actions of the stabilizer part D13 in case of a recovering line. It should be noted that the method works for a line even if the line in the beginning is completely unknown. The method can be performed both in the downstream DS and upstream US direction for the line.

The above very briefly presented method will be described in detail below.

A first step D1 includes the monitoring of parameters by reading the running configuration directly from the node. The parameters in question can be the actual bit rate R, the delay D, the impulse noise INP and the SNR margin ΔSNR.

In a step D2 the rate R is stored as a data buffer value R*. The initialization procedure is then finished.

In a step D3 the running configuration is checked after a parameter value is eventually changed by the method.

An actual SNR margin value ΔSNR is loaded as an auxiliary data buffer value ΔSNR* in a step D4.

In a step D5 values for the line performance parameters FEC, ES and UAS are monitored. Average values $\mu_{FEC}$, $\mu_{ES}$ and $\mu_{UAS}$ for the parameters are generated as described in connection with FIG. 4. These average values are to be compared with the above mentioned threshold values ThFEC, ThES and ThUAS, respectively. The threshold values can be predefined by e.g. a network operator or a customer. The threshold value ThFEC can also be loaded by the average FEC number $\mu_{FEC}$ as measured after the last Stabilizer action of the stabilizer D13 (SNR or INP increase).

In a step D6 there is tested if there are many unavailable seconds for the monitored line, i.e. if $\mu_{UAS} \geq$ ThUAS. That is a test of the worst case and the threshold can be of the magnitude 15 lost seconds a month.

If the question in step D6 is answered with "Yes" the line must be stabilized. In a step D7 an SNR margin increase variable ΔSNR$_I$ is loaded with a parameter ΔSNR_H, (High), which can be of the magnitude 10 dB. The magnitude 10 dB is specified on beforehand.

When describing the method, instead of going on with the stabilizer D13, we look what happen if the question in step D6 $\mu_{UAS} \geq$ ThUAS is answered with "No". In a step D8 the method then tests if $\mu_{ES} \geq$ ThES.

If the question in step D8 is answered with "Yes" the line must be stabilized. In a step D9 the SNR margin increase variable ΔSNR$_I$ is loaded with a parameter ΔSNR_L, (Low), which can be of the magnitude 5 dB, specified on beforehand.

If on the other hand the question in step D8 is answered with "No" the performer part D12 of the method is reached. It is then checked in a step D10 if for the FEC parameter if $\mu_{FEC} \leq$ ThFEC.

If the question in step D10 is answered with "No", then the method continues with a step D11 following the arrow back for taking next monitoring step. The steps D4 and D5 are jumped over and the method is back in step D6.

Above is described what happens if the questions in steps D6 and D8 are answered with "Yes". The method can continue with a step D14. In this step the buffered value ΔSNR* in step 4 is increased by the value ΔSNR$_I$, which is either ΔSNR_H or ΔSNR_L from steps D7 and D9 depending on whether the question in step D6 was answered with "Yes". The new value is set to ΔSNR* ← ΔSNR* + ΔSNR$_I$.

In steps D15 and D16 two different tests are made and the results of the tests are then compared.

First in the step D15 an SNR margin test is performed. The subscriber line is brought up with the new ΔSNR* value from step D14 and the old INP value from step D3. Resulting bit rate value $R_S$ and delay time value $D_S$ are monitored and stored.

In the step D16 an INP test is then performed. The subscriber line is brought up with the old ΔSNR value from step D3 and a new INP value denoted by INP+1. The designation INP+1 means that the INP number goes from one predetermined value to the next, e.g. from the number 4 to the number 8 as e.g. is shown in the FIGS. 6-9. Resulting bit rate value $R_I$ and delay time value $D_I$ are logged.

In a step D17 is compared if $R^* - R_I \geq R^* - R_S$. This comparison investigates whether the value $R_I$ gives a higher bit rate penalty, i.e. loss in bit rate, than the value $R_S$. As a low bit rate loss is desirable the comparison makes it possible to select a change in the SNR value or a change in the INP value as tested in the steps D15 respectively D16. In the step D17 is also checked if the bit rates $R_I$ and $R_S$ are above a limit $R_{min}$, set by an operator. Also the delay time value $D_I$ from the step D16 is checked to be below a limit $D_{max}$, set by an operator.

If the question in step D17 is answered with "Yes", then in a step D18 the SNR margin value is changed. The value INP and the value ΔSNR* tested in step D15 are selected and the bit rate $R_S$ and the delay time value $D_S$ are accepted.

If the question in step D17 instead is answered with "No", then in a step D19 the INP value is changed. The value INP+1 and the value ΔSNR tested in step D16 are selected and the bit rate $R_I$ and the delay time value $D_I$ are accepted.

In a step D20 the buffer R* is loaded with the new bit rate value $R_I$ and the method continues by going back to the step D3 to check if the new configuration has been placed in force.

A step D21 takes care of a situation when both questions in steps D6 and D9 of the stabilizer D13 were negative. If in step D10 the question $\mu_{FEC} \leq$ ThFEC is answered with "Yes", then the method reverses the last stabilization and goes back to earlier stored configuration values from the stabilizer D13. This is essential if e.g. the noise on the subscriber line goes down. Step 21 makes it possible to go back to more performance (rate) rather than stability.

A notation D22 indicates a method loop. The subscriber line is monitored and if the actions in steps D18, D19 or D21 did not result in expected values for the bit rate R, the delay D, the impulse noise protection INP or the signal to noise value ΔSNR, then an alarm is set.

Below the above described method will be further discussed. It is mentioned more in detail e.g. when the line is monitored or reconfigured.

Initialization Procedure

When the optimizer DAO1 is enabled on an activated ADSL line, e.g the line L2, in either the upstream US or the downstream DS direction, the running line configuration is read from the node.

The ADSL mode (ADSL1, ADSL2 and ADSL2+) does not have to be taken into account since the INP concept is applicable for all ADSL technologies. Also if INP is enabled, just the interleaved path parameters are relevant and the fast-path parameters are irrelevant.

The actual parameters rate R, delay D, impulse noise protection INP and Target SNR Margin ΔSNR are readout and stored. The actual rate R is loaded onto the auxiliary rate variable R*, step D2, that is used to compare the rate decrease for the SNR or INP increase strategy.

During the initialization procedure, the status of the line has to be checked (ATU-R present, line active). The stabilizer DAO1 can just be activated on a running line. After deactivating the stabilizer on a line, the initialization procedure has to be run again to load the running configuration parameters.

Checking the running configuration in the step D3 does not have to be executed after the init procedure. After each optimization step (INP or SNR margin increase), this running configuration read-out has to be performed.

Monitoring Phase

Before the stabilizer DAO1 goes into monitoring, always except the first time (after the initialization procedure) the configuration of the line is read to check whether the last optimization step (INP or SNR margin increase) has taken effect. If the proposed configuration from the last step is loaded, the running configuration task is ending with loading the auxiliary variable $\Delta SNR^*$ with the actual margin $\Delta SNR$, step D4. After this, the loop of the method is entered.

If the line did not sync up in the proposed configuration (e.g. impossible configuration loaded failure), the exception strategy in step D3 has to be placed (fallback to last running configuration, DAO disabling and fire an alarm trap).

The line performance is monitored in step D5 by querying the parameters ES, UAS and FEC events in $\Delta t$ time instances over the number N instances, FIG. 4. This yields the windowed averages $\mu_{ES}$, $\mu_{UAS}$ and $\mu_{FEC}$. If, in step D6, the unavailable seconds mean value $\mu_{UAS}$ is larger than the configured threshold ThUAS, the SNR margin increase variable $\Delta SNR_I$ is loaded with the parameter $\Delta SNR\_H$, step D7, and the execution phase is started. If in step D8 the value $\mu_{ES}$ is larger than the preconfigured threshold ThES, the margin increase variable $\Delta SNR_I$ is loaded with the other parameter $\Delta SNR\_L$, step D9, and also there the execution phase is entered.

Caution has to be taken with the UAS seconds since they can be generated either by a problematic line or a not present customer premises equipment CPE. Thus the monitoring has to check that a functional CPE is connected on the far-end of the line and that the line is active. If no CPE is present or the CPE is switched off, the optimizer DAO1 has to be paused automatically and restarted in case a CPE is available. During the pausing, performance counters are not logged and the averages are not updated. Also during a profile change, the parameter UAS are not logged and the logging windows are reset.

The threshold parameters ThUAS and ThES together with the margin step size $\Delta SNR\_H$ (high step) and $\Delta SNR\_L$ (low step) have to be configured by the user. A ThUAS threshold crossing signals an unstable line (severe event since line drops after 10 UAS) and a large step-size in SNR margin ($\Delta SNR\_H$) is proposed whereas a ThES crossing event signals corrupted packets (QoS decrease, not so severe cause line is still functional) and thus a lower step-size ($\Delta SNR\_L$) is enough.

For a well behaving line (no ThUAS or ThES crossing), the DAO Performer is started to check if the number of FECs has decreased. The threshold ThFEC can be configured or loaded with historical FEC levels (FEC levels that have been measured directly after changing the line configuration). If this is the case, the execution phase for the Stabilizer is started.

Execution Phase

The auxiliary variable is loaded in step D14 with the margin increase, either the high or low step depending which threshold has been crossed.

An SNR margin test is started in step D15. Thereby the line is dropped and restarted with the new SNR margin $\Delta SNR^*$ but with the old INP value. Resulting rate $R_S$ and delay $D_S$ are logged.

After that, the INP test in step D16 is taking the line down again, changing the actual configuration to the next higher INP value but the original SNR margin, bringing the line back in show-time and reading out the new bit rate $R_I$ and delay $D_I$.

The rate penalty for the two strategies, INP increase or SNR margin increase, is compared in step D17. If the rate penalty by jumping to the next higher INP value is larger than the rate penalty introduced by another SNR margin increase, the SNR margin is increased whereas in the other case, the INP value is changed. It is also possible to control the rate penalty and delay penalty by introducing a rate lower limit and delay upper limit. If the SNR margin space is exhausted, i.e. the SNR margin is already at a maximum value $\Delta SNR_{max}$ an INP change has to be done instead and the SNR margin is loaded with the minimum value. If a new SNR margin change is provoked, an INP change has to be done instead and the SNR margin is loaded with the minimum value.

If it is decided to do an SNR margin change in step D18, the line is restarted using the increased SNR margin $\Delta SNR^*$ and the actual INP value, resulting in the rate $R_S$ and the delay $D_S$. After this procedure, DAO jumps back to check if the change has taken effect (check running configuration). The new running SNR margin is loaded into $\Delta SNR^*$ and the optimizer DAO1 enters the monitoring stage.

If an INP change is triggered in step D19, the line is restarted with the next higher INP value INP+1 and the initial SNR value $\Delta SNR$ (not the increased $\Delta SNR^*$). After this the line will run with the rate $R_I$ and the delay $D_I$. The new rate $R_I$ is loaded into the auxiliary variable $R^*$ in step D20 to set the new comparison reference.

In case the new configuration does not work, the last working configuration is loaded in step D3 and an alarm is triggered.

The INP test has to be executed the first time the optimizer DAO1 enters the execution part (stabilizer D13) and then be executed only if the precedent action was an INP change. Else, the INP test can be jumped over as it does not give any new information on the "INP+1" rate since the INP test is performed on the standard SNR margin $\Delta SNR$. If the INP test can be skipped, the new configuration from the SNR margin test can be used directly and the line does not have to be restarted.

In case an INP change is initiated, the configuration from the foregoing INP test is already in force and the line does not have to be restarted.

If the performer part is executed due to an underflow of the FEC threshold ThFEC, the always last stabilizer step is reversed in step D21. If several performer executions are triggered in tandem without a stabilizer event in between, the sequence of stabilizer actions is reverted. The sequence of actions is therefore stored in memory.

Graphical Description of the Function of the Optimizer

Figure 12A:
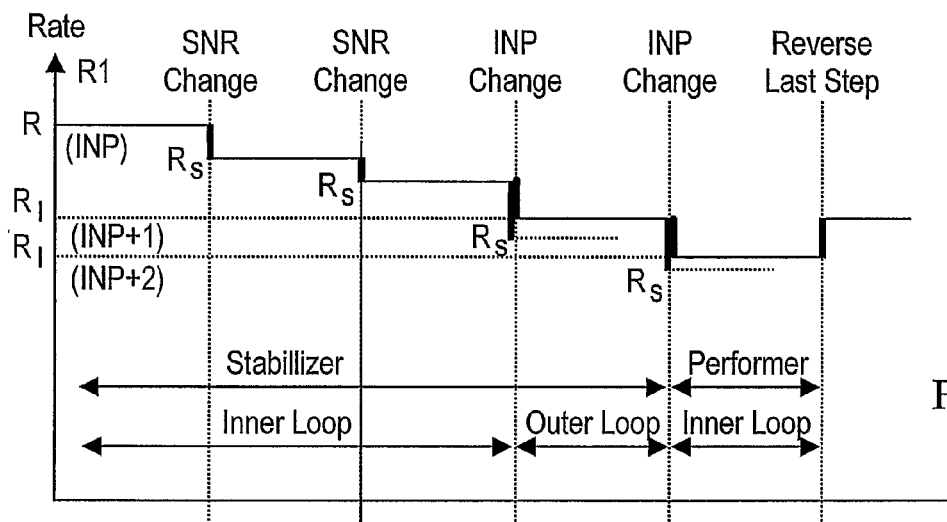
FIGS. 12a and 12b show timing diagrams over bit rate and parameters for different line changes.
Figure 12B:
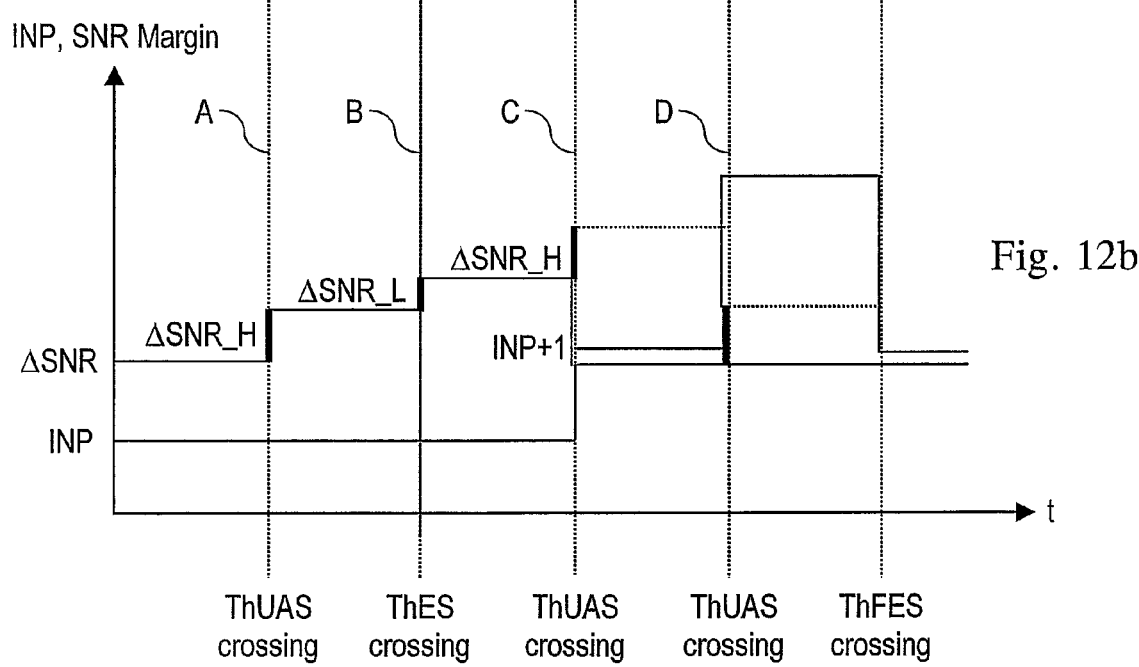

An example will be given in connection with FIGS. 12a and 12b on how the optimizer works. The figures depict a sequence of actions taken by the optimizer DAO1 during operation. The monitoring tool MT1 and the configuration tool CT1 operates on one of the subscriber lines, e.g. the line L2. FIG. 12a is a time t diagram with the transmission rate R1 on the ordinate and FIG. 12b is also a time diagram but with the configuration parameters INP and SNR Margin on the ordinate. Dotted lines A, B, C, D and E in the figures mark reconfiguration events. The subscriber line operates at rate R, FIG. 12a, and at an SNR margin ΔSNR, FIG. 12b.

Monitoring shows a problem with the performance parameter UAS at the subscriber line L2. Parameters INP and SNR margin test shows that the rate penalty is lower when increasing the SNR margin instead of using the next higher INP value INP+1. Thus in a first step, at line A, the SNR margin is increased by ΔSNR_H and the rate degrades to the value $R_S$. After checking that the new configuration of the line L2 is working, the optimizer DAO1 returns directly to the monitoring phase.

The second action is problem with the parameter ES, resulting in another SNR margin increase by ΔSNR_L at line B. The SNR test yields the new rate $R_S$. Since the new rate $R_S$ at line B is still larger than the rate $R_I$ for a value INP+1, another SNR margin change is initiated. In this case, the INP test can be skipped and the configuration from the SNR margin test change can be used directly without restarting the subscriber line L2.

In the third step, at line C, another SNR margin increase would lower the rate $R_S$ more than changing the parameter INP and using the original margin ΔSNR (not the incremented margin ΔSNR). Therefore the INP value is increased to the value INP+1. Now the INP test cannot be skipped in the next execution phase, since the rate $R_I$ for the INP value INP+2 has to be learned.

In the fourth interval, at line D, the optimizer DAO1 performer, step D12, comes into action because of a FEC threshold ThFEC underflow, reversing the last action, i.e. the last INP increase.

In the above embodiment is mentioned a set of parameters, including performance and configuration parameters. These parameters are mentioned in the ITU-T Recommendation G.997.1, which also mentions a number of alternative parameters. In the sections 7.1 and 7.2 are mentioned alternative performance parameters e.g. in 7.1.1.1.1 "Loss-of signal (LOS) failure" or in 7.2.1.1.4 "LOS second-line (LOSS-L)". In section 7.3 are mentioned alternative configuration parameters, e.g. in 7.3.1.1.2 "ATU impedance state forced (ASIF)" and also 7.3.2 lists a number of configuration parameters.

In the embodiment in FIG. 11 three different thresholds are used, ThUAS, ThES and ThFEC. In a simplified version only one threshold is used e.g. one of the thresholds ThUAS for unavailable seconds or ThES for error seconds. In such a case only the stabilizer D13 in modified form can be used, but the line will be stabilized. If also the threshold ThFEC is used it is possible to use the performer D12 and go back to earlier and better parameter values for the subscriber line when it recovers, e.g. when the noise level goes down.

The invention claimed is:

1. An arrangement for configuring subscriber lines in a digital access network having a plurality of access nodes connected to a plurality of subscribers via the subscriber lines, the arrangement comprising:
   a configuration tool connected to the network for downloading configuration parameters into the access nodes, said access nodes including means for configuring the subscriber lines according to the configuration parameters; and
   a monitoring tool connected to the access network and to the configuration tool for monitoring performance parameters for the subscriber lines, said monitoring tool comprising:
      means for comparing a value of a first monitored performance parameter on each subscriber line with a predefined threshold value, wherein the first monitored performance parameter belongs to a selected set of performance parameters of a predetermined type; and
      means, based on a result of the comparison, for changing a value of a first configuration parameter or repeating the monitoring of the first performance parameter.

2. The arrangement according to claim 1, wherein the monitoring tool also includes means for transmitting the changed configuration parameter value to the configuration tool for downloading in an access node and reconfiguring of the subscriber line.

3. The arrangement according to claim 1, wherein the means for changing the configuration parameter includes:
   means for determining a penalty for the change on a predetermined one of the performance parameters;
   means for changing a value of a second one of the configuration parameters and for determining a penalty for the second change on the predetermined performance parameter; and
   means for determining and performing the change with the smallest penalty.

4. The arrangement according to claim 1, wherein a second threshold is predefined for an alternative performance parameter and wherein the monitoring tool also includes:
   means for comparing a value of the alternative performance parameter on a subscriber line with a second predefined threshold value; and
   means, based on the comparison with the two thresholds, for changing the first configuration parameter with either a predetermined high step or a predetermined low step.

5. A method of configuring subscriber lines in a digital access network, said method comprising the steps of:
   configuring the subscriber lines according to configuration parameters;
   predefining for a subscriber line, a first threshold value for a performance parameter selected from a set of performance parameters of a predetermined type; and
   utilizing an automatic monitoring tool for performing the steps of:
   checking configuration parameters for the subscriber line;
   monitoring the selected performance parameter on the subscriber line;
   comparing a monitored value of the selected performance parameter with the first threshold value;
   changing a value of a first configuration parameter if the monitored value of the selected performance parameter does not meet the first threshold value; and
   repeating the monitoring of the first performance parameter if the monitored value of the selected performance parameter meets the first threshold value.

6. The method according to claim 5, wherein the monitoring tool also performs the step of transmitting the changed configuration parameter value to a configuration tool for downloading in an access node in the network and reconfiguring of the subscriber line.

7. The method according to claim 5, wherein the step of changing the value of the first configuration parameter includes the steps of:
   determining a penalty for the change on a predetermined one of the performance parameters;
   changing a value of a second one of the configuration parameters and determining a penalty for the second change on the predetermined performance parameter; and
   determining and performing the change with the smallest penalty.

8. The method according to claim 5, further comprising the steps of:
- predefining a second threshold for an alternative performance parameter;
- comparing a value of the alternative performance parameter on a subscriber line with a second predefined threshold value; and
- changing the first configuration parameter with either a predetermined high step or a predetermined low step, based on the comparison with the two thresholds.

9. A node for configuring subscriber lines in a digital access network, the node having a connection for the network and a connection for a configuration tool, the node comprising:
- an element handler with the connection to the network for reading line specific information parameters from the network;
- a database handler for collecting information in the node;
- a line test handler connected to the element handler and the database handler for sending the line specific information parameters to the database handler;
- an external interface handler with the connection to the configuration tool for transmitting the line specific information parameters from the database handler to the configuration tool; and
- an optimizer for collecting at least a part of the line specific information parameters, for comparing at least one of the parameters with a predefined threshold, and for either changing a value for a predetermined one of the parameters or repeating the check of the line specific information parameters, wherein the part of the line specific information parameters belong to a set of line performance parameters of a predetermined type.

* * * * *

UNITED STATES PATENT AND TRADEMARK OFFICE
CERTIFICATE OF CORRECTION

PATENT NO. : 7,881,219 B2
APPLICATION NO. : 12/296691
DATED : February 1, 2011
INVENTOR(S) : Trojer It is certified that error appears in the above-identified patent and that said Letters Patent is hereby corrected as shown below:

In Fig. 3, Sheet 2 of 8, delete "  " and insert --  --, therefor.

In Fig. 7, Sheet 4 of 8, delete "  " and insert --  --, therefor.

In Fig. 11, Sheet 7 of 8, for Tag "D10", in Line 1, delete "$\mu FEC \geq ThFEC?$" and insert -- $\mu FEC \leq ThFEC?$ --, therefor.

In Column 15, Line 39, delete "(ASIF)"" and insert -- (AISF)" --, therefor.

Signed and Sealed this
Thirty-first Day of May, 2011

David J. Kappos
*Director of the United States Patent and Trademark Office*